United States Patent
Scheckel et al.

(10) Patent No.: US 8,349,061 B2
(45) Date of Patent: Jan. 8, 2013

(54) COMBINATION RELIEF VALVE AND DRAINAGE MECHANISM REQUIRING INSERTED ELEMENT TO PERMIT DRAINAGE IN A COALESCER SYSTEM

(75) Inventors: Benjamin L. Scheckel, Stoughton, WI (US); Bradley A. Smith, Madison, WI (US); Chirag D. Parikh, Madison, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 165 days.

(21) Appl. No.: 12/947,195

(22) Filed: Nov. 16, 2010

(65) Prior Publication Data
US 2011/0113737 A1    May 19, 2011

Related U.S. Application Data

(60) Provisional application No. 61/261,566, filed on Nov. 16, 2009.

(51) Int. Cl.
*B01D 46/46* (2006.01)
(52) U.S. Cl. ............... 96/405; 96/408; 96/412; 55/314; 55/417; 55/423; 55/425
(58) Field of Classification Search .............. 55/515, 55/DIG. 17, 433, 312, 313, 314, 417, 423, 55/425; 95/117; 96/108, 147, 405, 408, 96/412; 34/80, 472, 473; 210/DIG. 17, 313, 210/444
See application file for complete search history.

(56) References Cited

U.S. PATENT DOCUMENTS

| | | | | |
|---|---|---|---|---|
| 3,146,194 | A * | 8/1964 | Hathaway | 210/130 |
| 3,768,659 | A * | 10/1973 | Miller | 210/313 |
| 4,038,051 | A * | 7/1977 | Ide | 96/408 |
| 7,972,418 | B2 * | 7/2011 | Hilberer | 95/117 |
| 2002/0092280 | A1 | 7/2002 | Gieseke et al. | |
| 2004/0211181 | A1 | 10/2004 | Fornof | |
| 2004/0237484 | A1 | 12/2004 | Altvater et al. | |
| 2008/0190832 | A1 | 8/2008 | Schachtrup et al. | |
| 2009/0050121 | A1 | 2/2009 | Holzmann et al. | |
| 2010/0024366 | A1 * | 2/2010 | Hodges et al. | 55/320 |
| 2011/0265655 | A1 * | 11/2011 | Schuster et al. | 96/134 |

OTHER PUBLICATIONS

International Preliminary Report on Patentability issued May 31, 2012, for PCT/US2010/056815.

* cited by examiner

*Primary Examiner* — Duane Smith
*Assistant Examiner* — Minh-Chau Pham
(74) *Attorney, Agent, or Firm* — Andrus, Sceales, Starkes & Sawall, LLP

(57) ABSTRACT

Disclosed are coalescer systems for coalescing a liquid phase dispersed in a gas phase. The disclosed systems include a filter element which, when installed in the system, contacts and moves a valve to an open drainage position to permit flow of liquid through the system. In the disclosed systems, the filter element and valve also are configured such that under excess pressure conditions the valve permits the gas phase to bypass filter media of the filter element. In particular, the disclosed coalescer systems may be utilized in a CV system in order to remove oil mist from gas in the CV system.

20 Claims, 15 Drawing Sheets

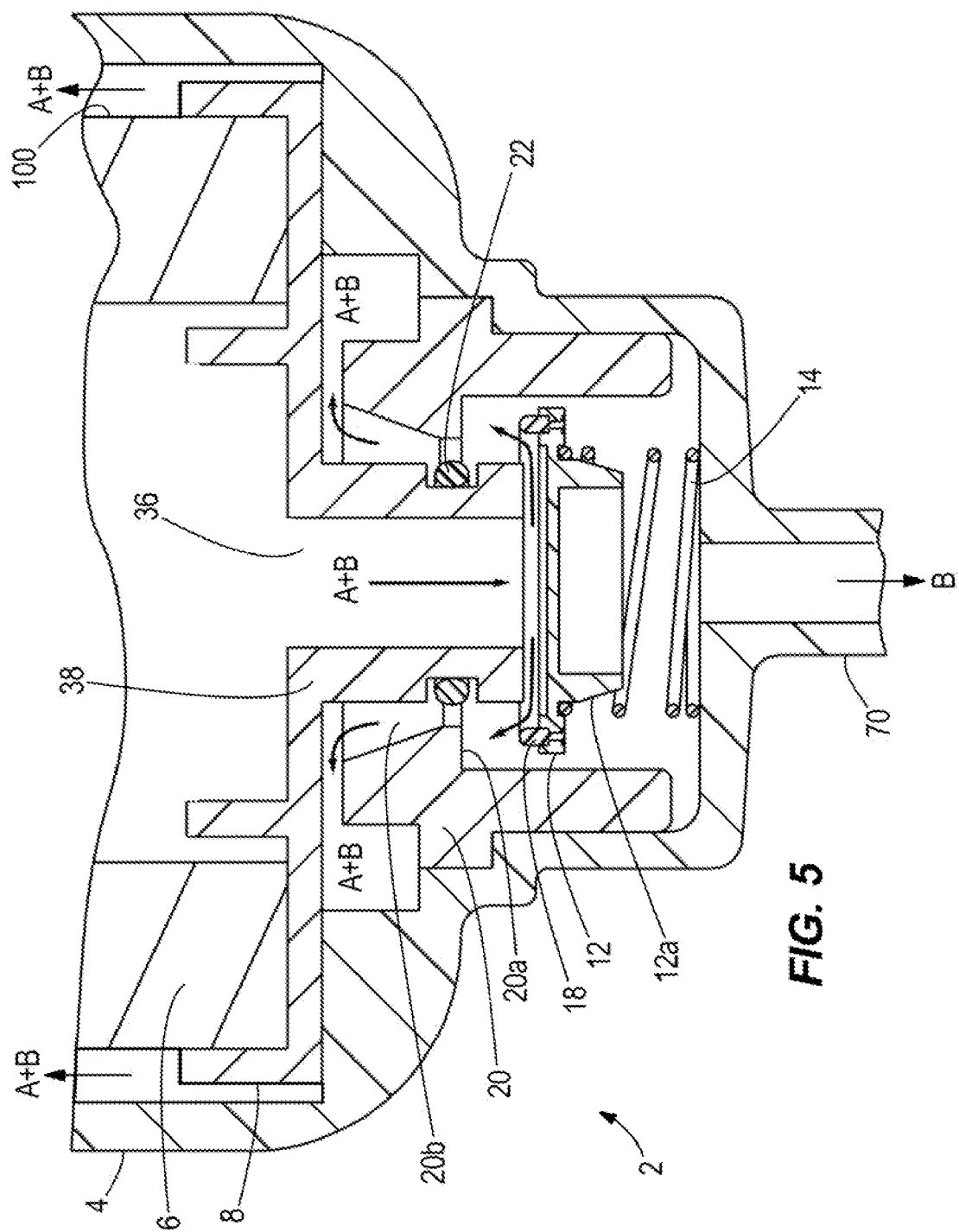

COMBINATION RELIEF VALVE AND DRAINAGE MECHANISM REQUIRING INSERTED ELEMENT TO PERMIT DRAINAGE IN A COALESCER SYSTEM

CROSS-REFERENCE TO RELATED APPLICATIONS

The present application claims the benefit of priority under 35 U.S.C. §119(e) to U.S. Provisional Application No. 61/261,566, filed on Nov. 16, 2009, the content of which is incorporated herein by reference in its entirety.

BACKGROUND

The field of the invention relates to coalescer systems for coalescing a mixture of two phases, namely a continuous phase and a dispersed phase. In particular, the field relates to coalescer systems for coalescing drops of a dispersed phase liquid phase in a continuous gas phase in order to collect and remove the dispersed phase from the continuous gas phase.

Coalescer systems are used widely to remove immiscible droplets from a gaseous or liquid continuous phase, such as in crankcase ventilation (CV) filtration, fuel water separation (FWS), and oil-water separation. For CV applications, near 100% removal efficiency of oil mist is required to protect the turbocharger in closed CV applications and to protect the environment in open CV applications. Increasingly high efficiency, low pressure drop and longer life are sought. To accomplish this, coalescer systems should be protected from plugging, submicron droplets need to be removed, and the oil needs to drain efficiently from the system.

SUMMARY

Disclosed are coalescer systems for coalescing a dispersed phase from a continuous phase. The disclosed systems may be utilized in order to collect and remove a liquid dispersed phase from a continuous gas phase. The disclosed systems include a filter element which coalesces the liquid dispersed phase and when installed in the system, contacts and moves a drainage valve to an open position or "set position" to permit drainage of the coalesced liquid phase. When the filter element is removed from the system, the drainage valve moves to a closed position preventing the coalesced liquid phase from draining from the system and into the environment. In the disclosed systems, the filter element and drainage valve also are configured such that under excess pressure conditions, for example, when the filter media of the filter element is plugged and excess pressure develops in the system, the continuous gas phase and dispersed liquid phase may bypass the filter media of the filter element via the excess pressure in the system moving the drainage valve to a bypass position. In particular, the disclosed coalescer systems may be utilized in a CV system in order to remove oil mist from gas in the CV system.

BRIEF DESCRIPTION OF THE DRAWINGS

FIG. 5 provides a two-dimensional cross-section view of one embodiment of a drainage end of a coalescer system as contemplated herein.

DETAILED DESCRIPTION

Disclosed are coalescer systems for coalescing a dispersed phase from a continuous phase. In particular, the disclosed systems may be utilized in order to collect and remove a liquid dispersed phase from a continuous gas phase. The disclosed systems include a filter element which may coalesce a liquid dispersed phase and when installed in the system, contacts and moves a drainage valve to an open position or set position to permit drainage of the coalesced liquid phase. As such, the term "open" is utilized herein to refer to a configuration of the system whereby the filter element is inserted and has moved the drainage valve to an open position to permit drainage of the coalesced liquid phase. When the filter element is removed from the system, the drainage valve moves to a closed position preventing the coalesced liquid phase from draining from the system and permitting servicing of the system without leaking coalesced liquid phase (e.g., oil) into the environment. In the disclosed systems, the filter element and drainage valve also are configured such that under excess pressure conditions, for example, when the filter media of the filter element is plugged, the continuous gas phase and dispersed liquid phase may bypass the filter media of the filter element via the excess pressure moving the drainage valve to a bypass position. The continuous gas phase and dispersed liquid phase then may exit the filter element through a drainage outlet, pass around the outside of the filter element and through a gas outlet. As such, the term "bypass" is utilized herein to refer to flow of the continuous phase through an drainage outlet of the filter element and not through the filter media.

Figure 1:
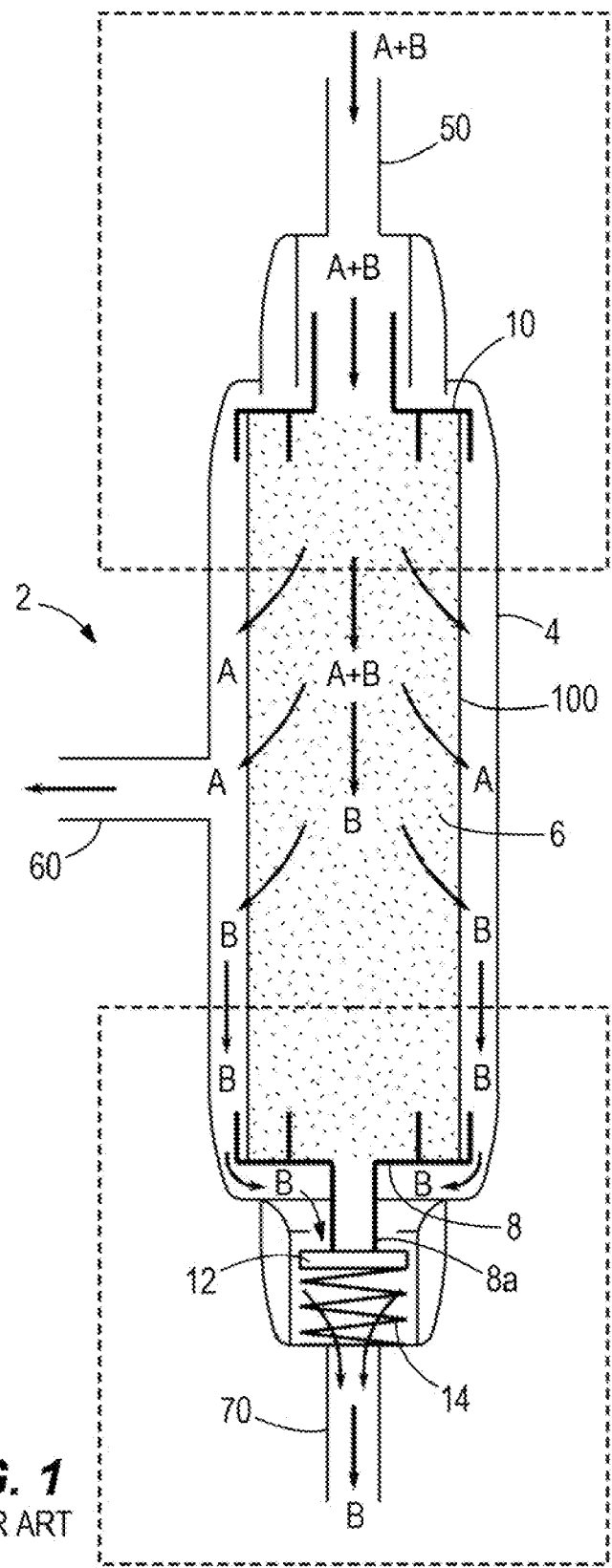
FIG. 1 illustrates a cross-sectional view of a coalescer system of the prior art having an intake end (top) and a drainage end (bottom).
Figure 2:
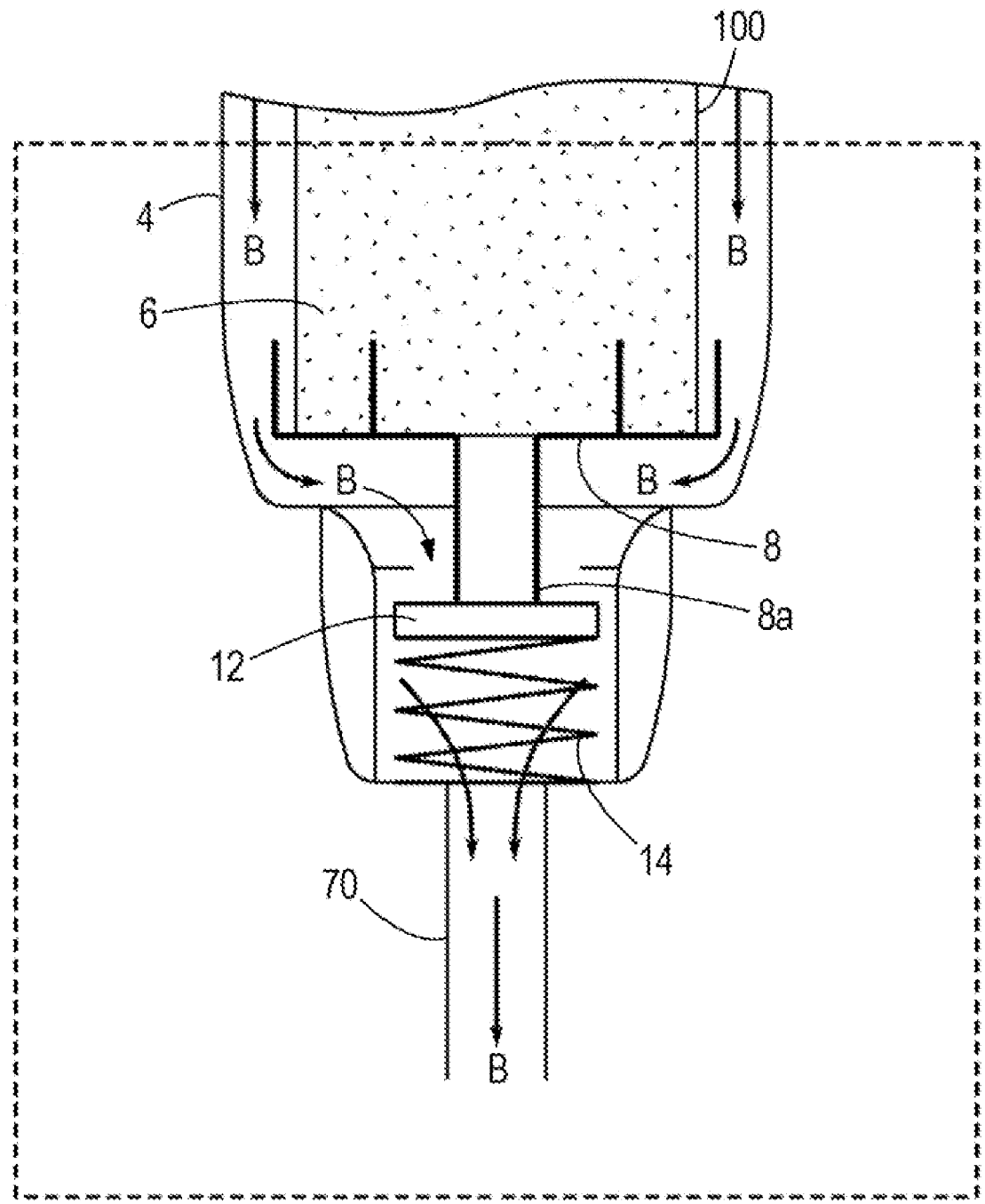
FIG. 2 illustrates an enlarged cross-sectional view of the drainage end of the coalescer system of the prior art as illustrated in FIG. 1.

Referring now to the figures, FIG. 1 illustrates a cross-sectional view of a coalescer system 2 of the prior art having an intake end and a drainage end (enlarged in FIG. 2). The system includes an intake inlet 50, a gas outlet 60, and a drainage outlet 70. The system 2 further includes a chamber 4 and a filter or coalescing element 100 (see also FIGS. 9 and 10) that includes media 6 and an intake end plate 10 and a drainage end plate 8. The system 2 also includes a valve having a disc or ball 12 biased into a closed position by a mechanism such as a spring 14. When the filter element 100 is inserted in the system 2, a protrusion 8a on the drainage end plate 8 contacts the disc or ball 12 and moves the disc or ball 12 into an open drainage position. In the system 2, a gaseous phase A (e.g., air and/or other gas) comprising a dispersed liquid phase B (e.g., hydrocarbon liquid (such as oil mist) and/or water) enters the intake inlet 50. The gaseous phase A passes through the filter media 6 and exits the system laterally through the gas outlet 60. The dispersed liquid phase B coalesces in the filter media 6 and drains vertically through the system. Arrows illustrate the flow of gas A through the system where the gas includes dispersed liquid B such as oil (FIG. 1). The dispersed liquid B coalesces in the media and drains from the system, also as illustrated by arrows. When the filter element 100 is inserted in the system 2 and the disc or ball 12 is in an open position, the coalesced liquid B drains from the drainage outlet 70.

Figure 3A:
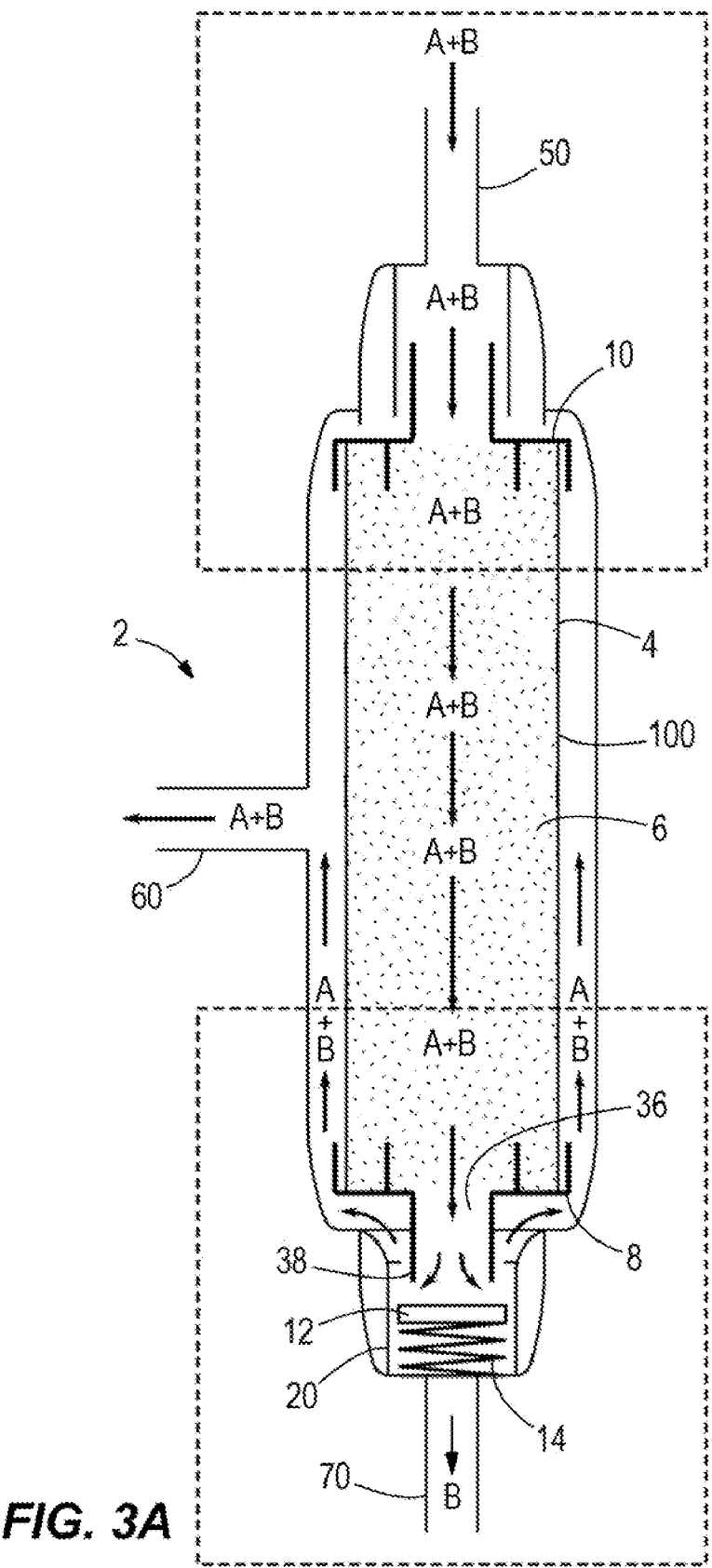
FIG. 3 illustrates a cross-sectional view of one embodiment of a coalescer system as contemplated herein having an intake end and an opposite end that functions as a drainage end.
Figure 3B:
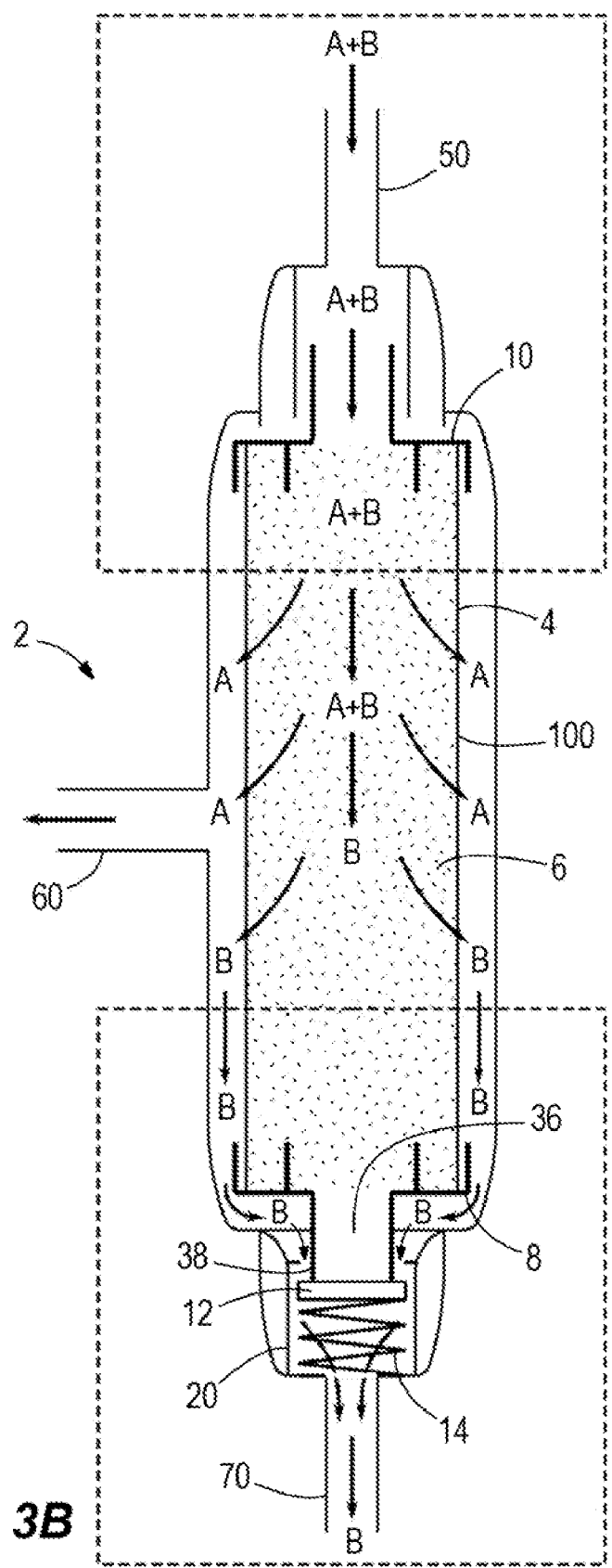
Figure 4A:
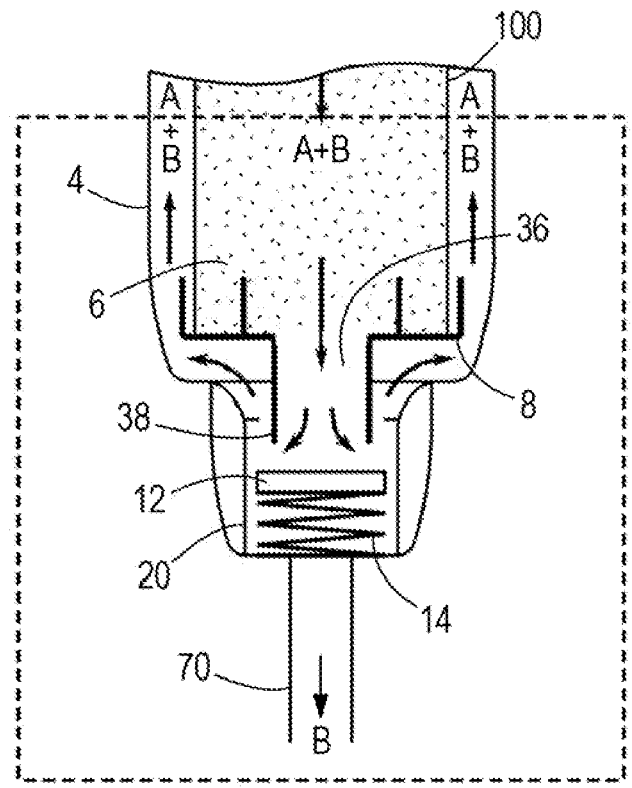
FIG. 4 illustrates an enlarged cross-section view of the drainage end of the coalescer system as illustrated in FIG. 3 under bypass conditions (A) and under open drainage, non-bypass conditions (B).
Figure 4B:
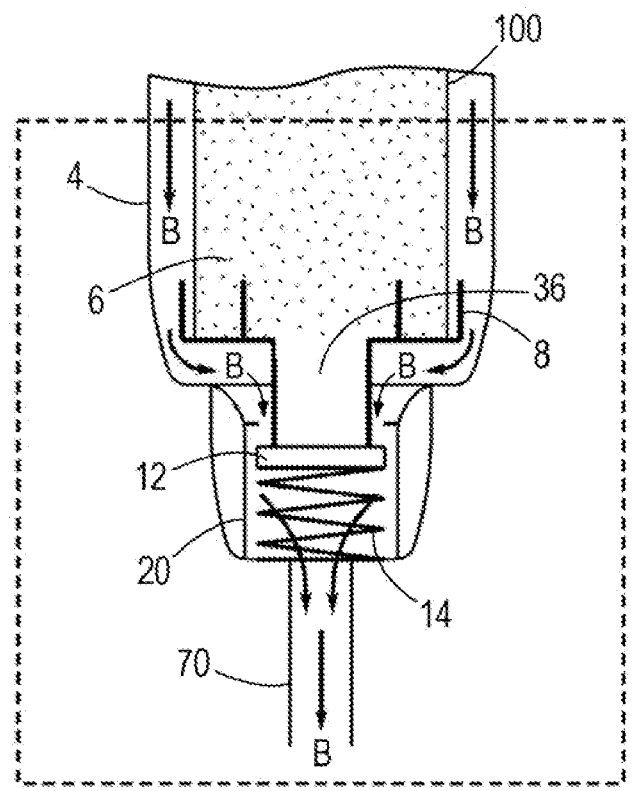

FIG. 3 illustrates a cross-sectional view of a coalescer system 2 as contemplated herein having an intake end and a drainage end (enlarged in FIG. 4). The system includes an intake inlet 50, a gas outlet 60, and a drainage outlet 70. The system 2 further includes a chamber 4 and a filter or coalescing element 100 (see also FIGS. 9 and 10) that includes media 6 and an intake end plate 10 and a drainage end plate 8. The system 2 also includes a valve having a disc or ball 12 biased into a closed position by a mechanism such as a spring 14. When the filter element 100 is inserted in the system 2, a drainage spout 38 on the drainage end plate 8 contacts the disc or ball 12 and moves the disc or ball 12 into an open drainage position. In the system 2, a gaseous phase A (e.g., air and/or other gas) comprising a dispersed liquid phase B (e.g., hydrocarbon liquid (such as oil mist) and/or water) enters the intake inlet 50. The gaseous phase A passes through the filter media 6 and exits the system laterally through the gas outlet 60. The dispersed liquid phase B coalesces in the filter media 6 and drains vertically through the system as illustrated by arrows. Arrows also illustrate the flow of gas A through the system where the gas includes dispersed liquid B such as oil (FIG. 3). When the filter element 100 is inserted in the system 2 and the disc or ball 12 is in an open position, the coalesced liquid B drains from the drainage outlet 70 (FIGS. 3A and 4A). Under bypass conditions (FIGS. 3B and 4B), for example, as the filter media 6 becomes plugged, gas A and dispersed liquid B flow through an opening 36 in the drainage spout 38. Air pressure forces the disc or ball 12 downward against the bias spring 14 creating an exit gap for gas A and dispersed liquid B to flow out of the filter element 100. Gas A and dispersed liquid B flow along the outside of the filter media 6 and through the gas outlet 60. As such, the valve element functions as a relief valve for flow of gas A and dispersed liquid B under excess pressure conditions. Coalesced liquid B also may flow around the disc or ball 12 and through the drainage outlet 70.

FIG. 5 provides a two-dimensional cross-sectional view of one embodiment of a drainage end of a coalescer system 2 as contemplated herein. The arrows in FIG. 5 illustrate bypass flow through the system. The drainage end has a valve element that includes a disc 12 biased into a closed position via a spring 14. The disc 12 retains the spring 14 via a retaining ring 12a. As shown, the spring 14 fits around the outside of the retaining ring 12a. However, in other embodiments, the spring 14 may fit around the inside of the retaining ring 12a (FIGS. 10-14). The disc may be molded and includes a sealing element 18 on its top surface, such as an over-molded silicone or plastic ring. Optionally, the disc includes a patch of media on a top surface (e.g., a 1-2 mm patch of media (not shown)). The valve element also includes a sealing/retaining ring 20 that seals against the disc 12 and retains the disc 12 and spring 14 in position in the valve element. The drainage end plate 8 has a drainage spout 38 with an opening 36 through which through which gas A and dispersed liquid B may flow under excess pressure conditions (i.e., bypass conditions) such as when the filter media 6 is plugged and does not permit sufficient gas flow therethrough.

Further shown in FIG. 5, when the filter element 100 is inserted in the chamber 4 of the system 2, the drainage spout 38 contacts the disc 12 and moves the disc 12 to an open drainage position. The system typically includes only a single drain (i.e., a central drainage outlet 70 that is dependent upon insertion of the filter element 100 for drainage), but optionally the system may include a central drainage outlet 70 and a side drain (e.g., a side drain that does not depend on an inserted filter element 100 for drainage). When the filter element 100 is not inserted in the chamber 4 of the system 2, the disc 12 moves into a closed position and the sealing element 18 contacts an underside 20a of the sealing/retaining ring 20 and prevents liquid flow through the drainage spout 38. Optionally, the filter element 100 may have an identical drainage end plate 8 and intake end plate 10 and may be inserted in either orientation (i.e., with either end at the drainage end or intake end of the system (FIG. 9)). The drainage spout 38 of the drainage end plate 8 (and/or inlet spout 38 of the intake end plate 10) may have an O-ring 22 around an exterior surface (e.g., a neck of the spout) for sealing against an opening in the chamber 4.

As shown in FIG. 5, under excess pressure conditions (i.e., bypass conditions) such as when the filter media 6 becomes plugged, gas A and dispersed liquid B flow through an opening 36 in the drainage spout 38. Air pressure forces the disc or ball 12 downward against the bias spring 14 creating an exit gap for gas A and dispersed liquid B to flow out of the filter element 100. Gas A and dispersed liquid B flow along the outside of the filter media 6 and through the gas outlet 60. As such, the valve element functions as a relief valve for flow of gas A and dispersed liquid B under excess pressure conditions. Coalesced liquid B also may flow around the disc or ball 12 and through the drainage outlet 70. The system 2 is configured such that the filter element 100 contacts the valve element and moves the valve element to a predetermined position to create the desired valve opening or cracking pressure for the system. For example, in FIG. 5, the system 2 is configured such that the filter element 100 moves the disc 12 of the valve element to a predetermined position to create the desired valve opening or cracking pressure for the system based on compression of the spring 14).

Figure 6:
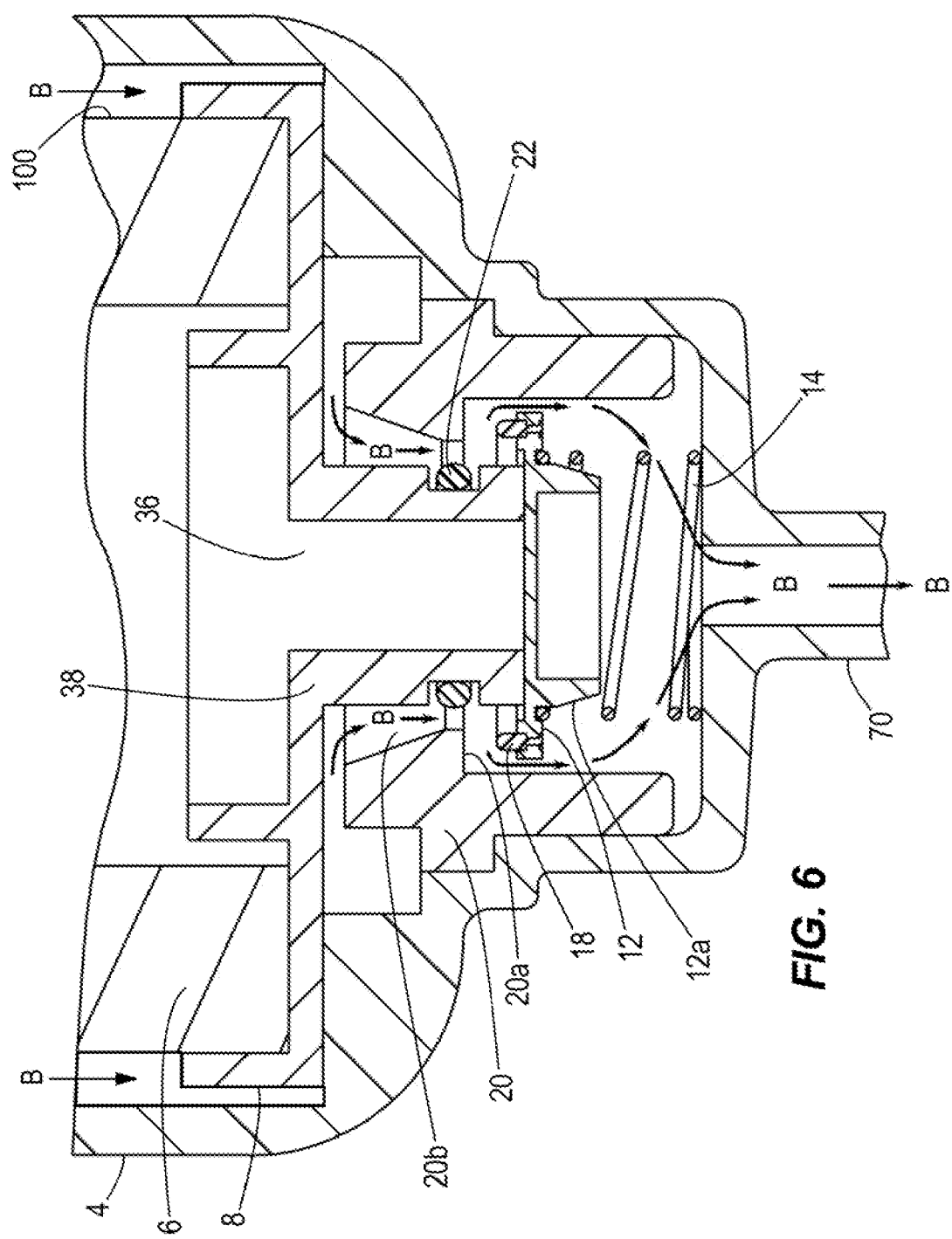
FIG. 6 provides another view of the drainage end of the coalescer system as shown in FIG. 5.

FIG. 6 provides another view of the drainage end of the coalescer system of FIG. 5. The arrows illustrate liquid B draining through the system when the filter element 100 is installed (i.e., normal drainage without bypass flow). Liquid B flows over a top surface 20b of the retaining ring 20 for the valve element, around an edge of the disc 12, and through the drainage outlet 70. When the filter element 100 is removed, the disc 12 moves into a closed position and the sealing element 18 contacts an underside 20a of the retaining ring 20 and prevents liquid B from flowing through the system.

Optionally, the filter element 100 may include weep holes at the end of the outlet end plate (e.g., at the end of a drainage spout present at the end of the outlet end plate) permitting flow of coalesced liquid phase therethrough. (See FIG. 13).

Figure 7:
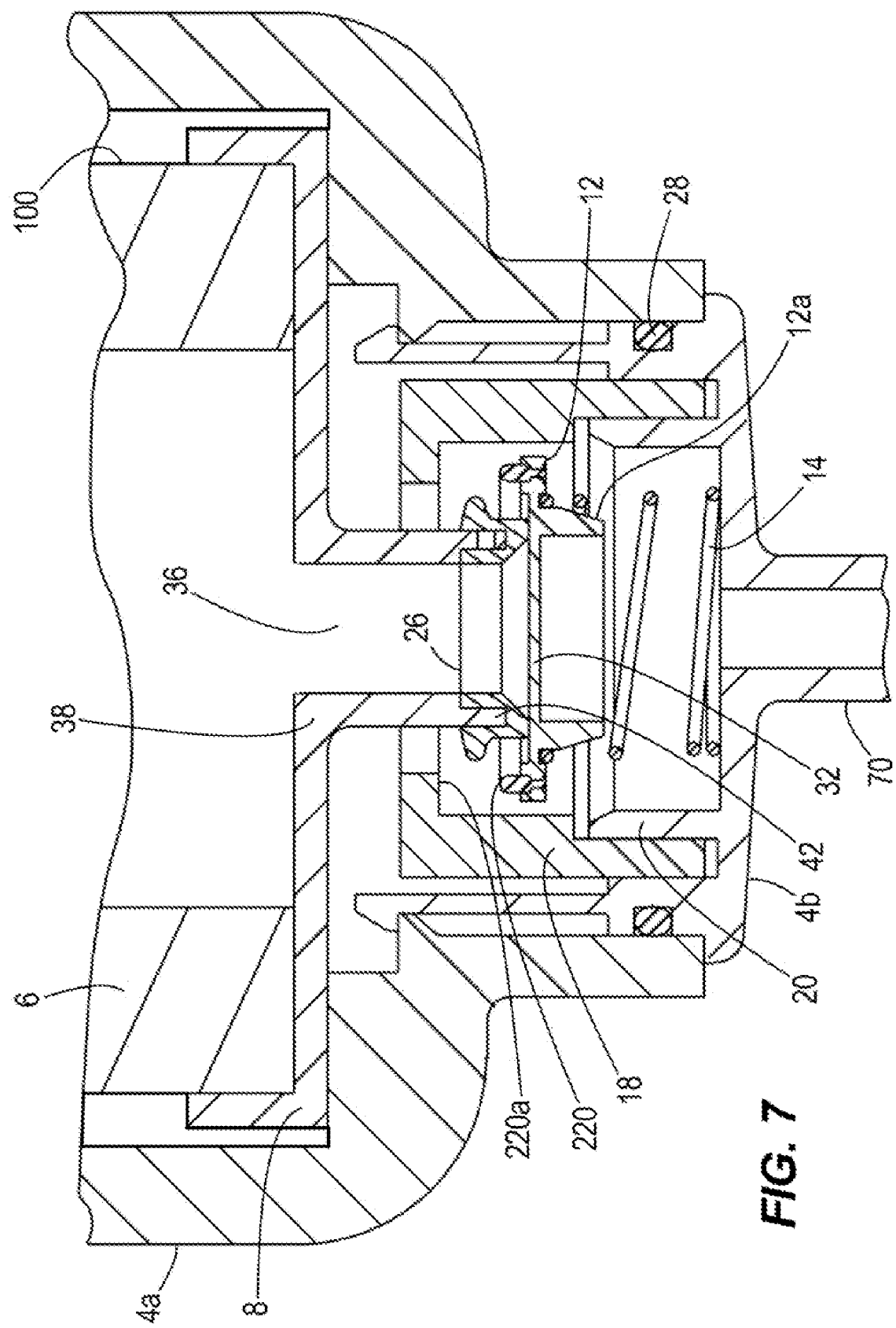
FIG. 7 provides a two-dimensional cross-sectional view of another embodiment of a drainage end of a coalescer system as contemplated herein.

FIG. 7 provides a two-dimensional cross-sectional view of another embodiment of a drainage end of a coalescer system 2 as contemplated herein. The system 2 includes a central chamber section 4*a* and a drainage chamber section 4*b* sealed against the central chamber section 4*a* via an O-ring 28. The drainage chamber section 4*b* includes a valve element that includes a disc 12 biased into a closed position via a spring 14. The disc 12 and spring 14 are retained via a retaining ring 20 present on the drainage chamber section 4*b*. A sealing ring 220 is positioned on the top surface of the retaining ring 20. The drainage end plate 8 has a drainage spout 38 with an opening 36 through which gas A and dispersed liquid media 6 may flow when the filter media 6 is plugged and does not permit sufficient gas flow therethrough.

As shown in FIG. 7, when the filter element 100 is inserted in the central chamber section 4*a* of the system 2, the drainage spout 38 contacts the disc 12 and moves the disc 12 to an open drainage position. When the filter element 100 is not inserted in the central chamber section 4*a* of the system 2, the disc 12 moves into a closed position and the sealing element 18 contacts an underside 220*a* of the sealing ring 220 and prevents liquid flow through the system. Optionally, the filter element 100 may have an identical drainage end plate 8 and intake end plate 10 (not shown) and may be inserted in either orientation (i.e., with either end at the drainage end or intake end of the system. (See FIG. 9)). The drainage spout 38 of the drainage end plate 8 (and/or inlet spout 38 of the intake end plate 10) may have a sealing gasket 26 about the rim of its end 42 for sealing axially against the disc 12 and/or for sealing radially against a sealing ring 120 in the inlet chamber section 4*c* (FIG. 8).

Figure 8:
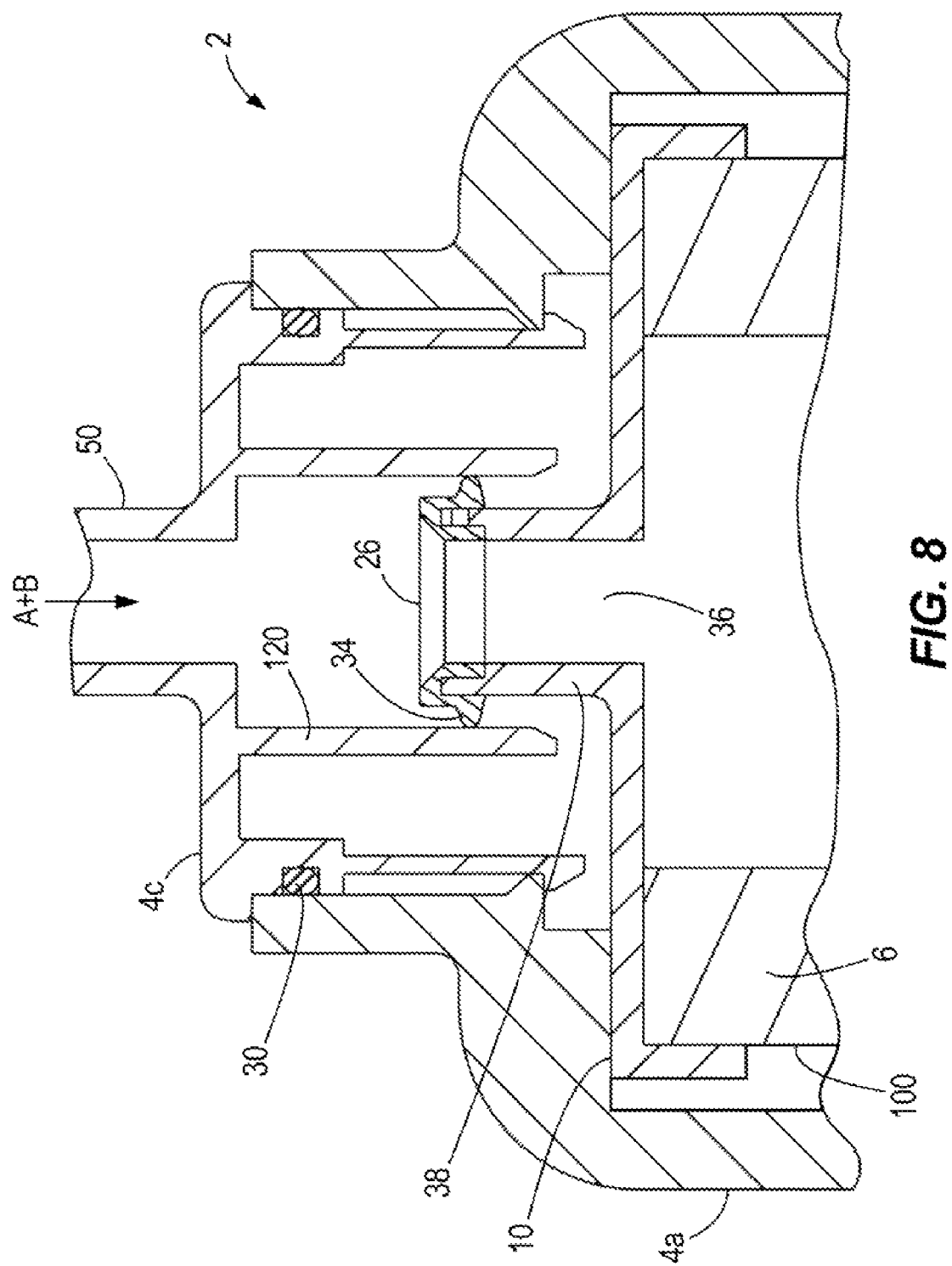
FIG. 8 provides a cross-sectional view of another embodiment of an intake end of a coalescer system as contemplated herein.

FIG. 8 provides a cross-sectional view of another embodiment of an intake end of a coalescer system as contemplated herein. The system 2 includes a central chamber section 4*a* and an inlet chamber section 4*c* sealed against the central chamber section 4*a* via an O-ring 30. The intake end plate 10 of FIG. 8 is identical to the drainage end plate 8 of FIG. 7. Gas A comprising dispersed liquid B flows into the system through the intake inlet 50 in the inlet chamber section 4*c* and through the opening 36 in the intake end plate 10. In this position, the sealing gasket 26 seals radially 34 against an interior wall of a sealing ring 120 of the intake inlet 50. The sealing gasket 26 is overmolded and functions to seal the inlet spout of the filter element 100 to the inlet chamber section 4*c* and to seal the outlet spout of the filter element 100 to the drainage chamber section 4*b*. (See FIG. 7).

Figure 9:
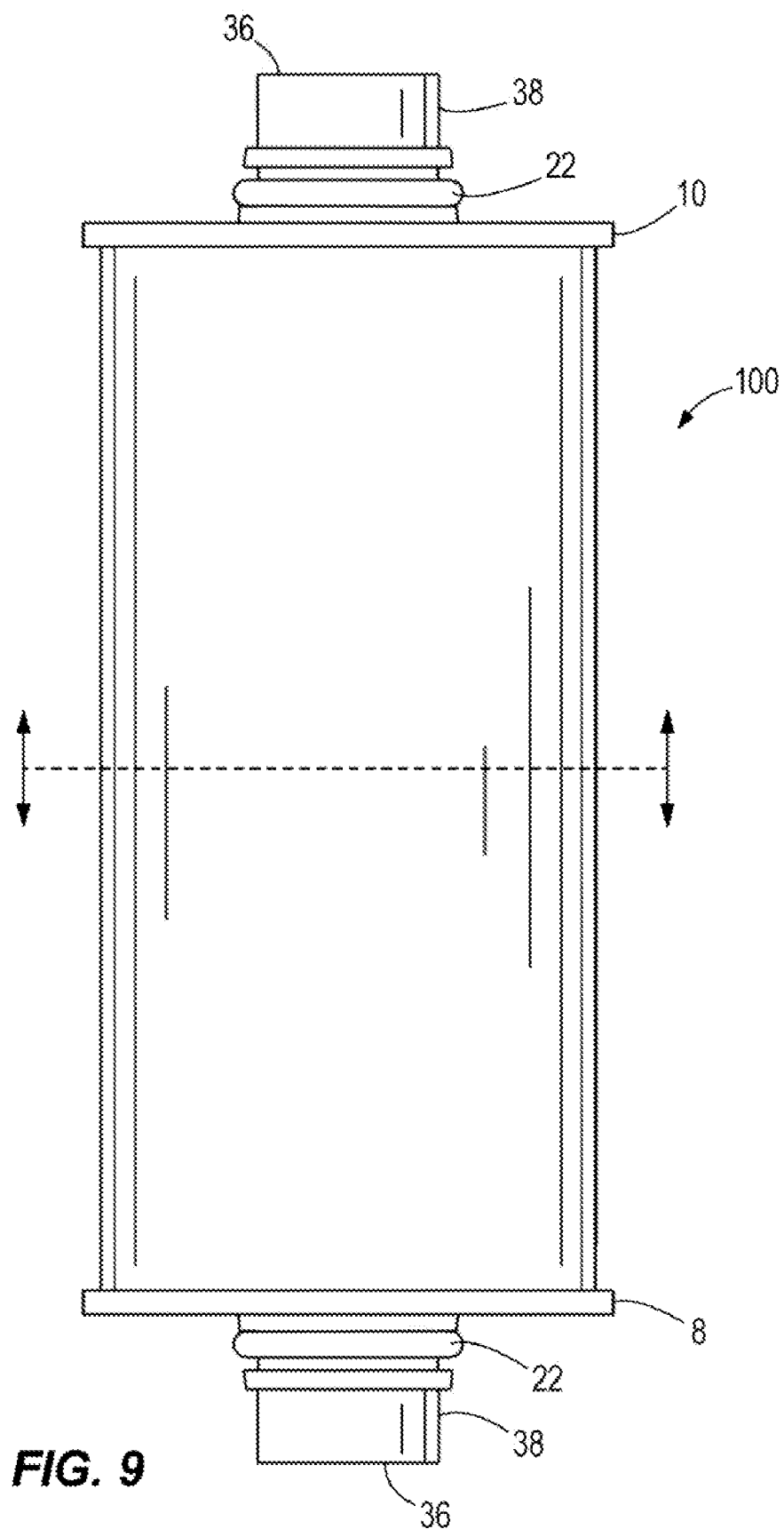
FIG. 9 illustrates a two-dimensional view of one embodiment of a filter element as contemplated herein having horizontal symmetry.

FIG. 9 illustrates a two-dimensional view of one embodiment of a filter element 100 as contemplated herein having horizontal symmetry. The drainage end plate 8 is identical to the intake end plate 10 such that the filter element 100 may be inserted in either orientation in the coalescer systems contemplated herein. Shown is an inlet/drainage spout 38 having an opening 36. An O-ring 22 is positioned around the neck of the inlet/drainage spout 38 for contacting a sealing surface in a chamber for receiving the filter element. Preferably, the sealing surface is chamfered (FIGS. 11-14).

Figure 10:
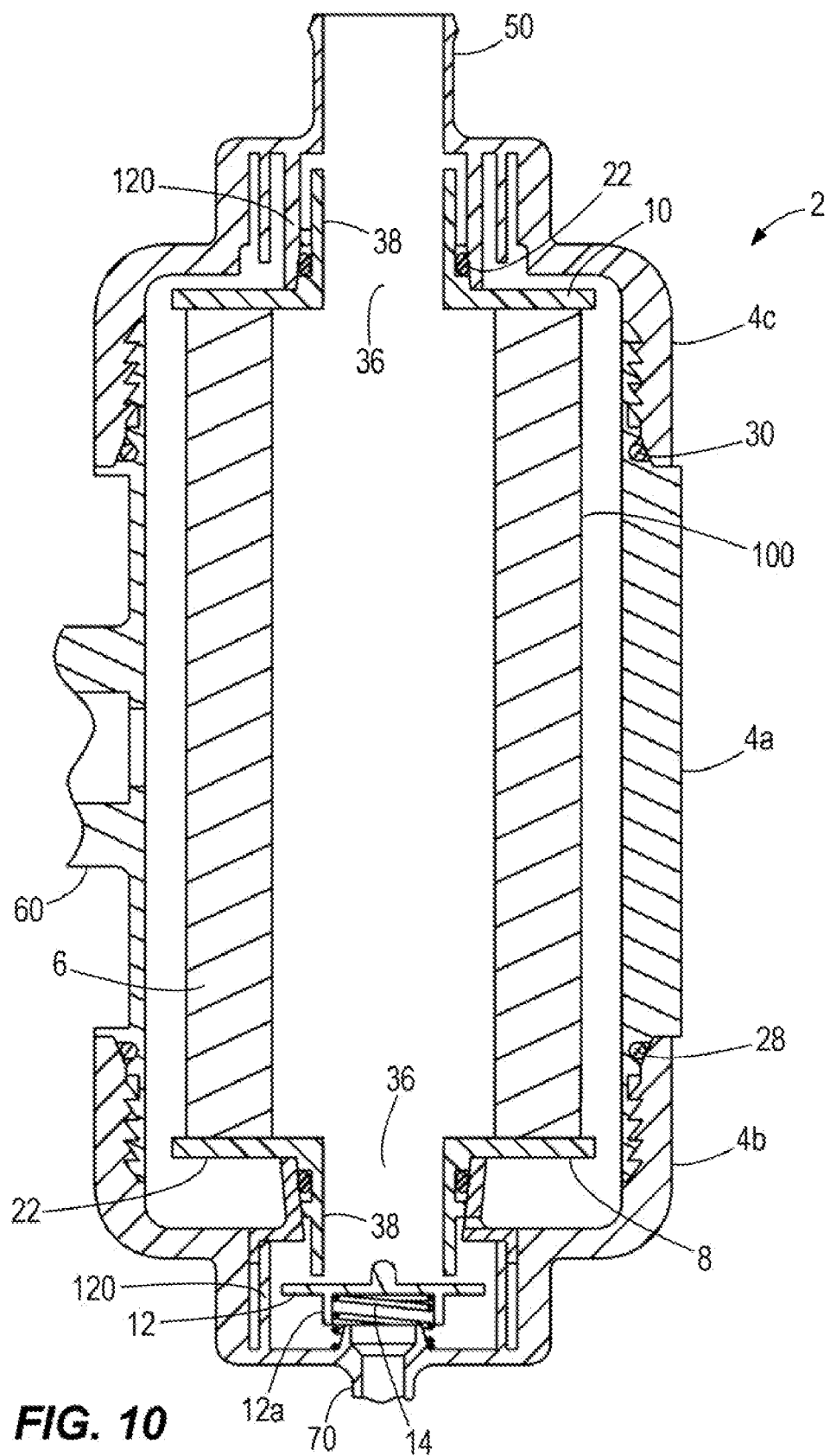
FIG. 10 illustrates a two-dimensional cross-sectional view of one embodiment of a coalescer system as contemplated herein.
Figure 11:
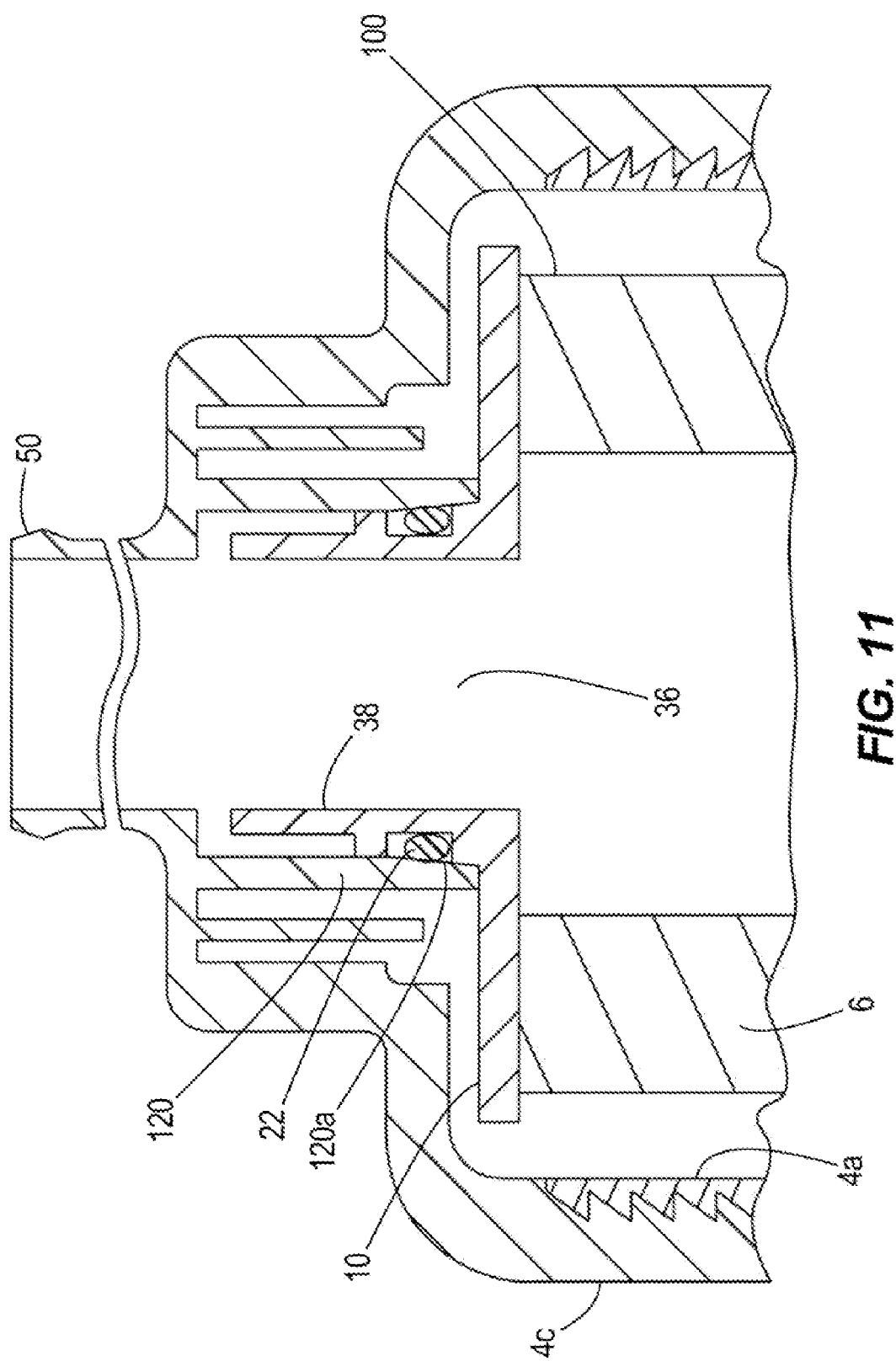
FIG. 11 illustrates an enlarged two-dimensional cross-section view of the intake end of the coalescer system of FIG. 10.

FIG. 10 illustrates a two-dimensional cross-sectional view of one embodiment of a coalescer system 2 as contemplated herein. Shown is a filter element 100 inserted in a filter chamber having a central chamber section 4*a*, a drainage chamber section 4*b*, and an inlet chamber section 4*c*. FIG. 11 illustrates an enlarged two-dimensional cross-section view of the intake end of the coalescer system of FIG. 10. The inlet chamber section 4*c* has a retaining ring 120 with a chamfered face 120*a* for contacting an O-ring 22 positioned on the neck of an inlet spout 38 of an intake end plate 10 of a filter element 100. The chamfered face 120*a* of the retaining ring 120 fixes the filter element axially to prevent vibratory damage during use. The chamfered face 120*a* also ensures that the O-ring 22 is always in compression. Air and oil enter the system through opening 36 in the inlet spout 38.

Figure 12:
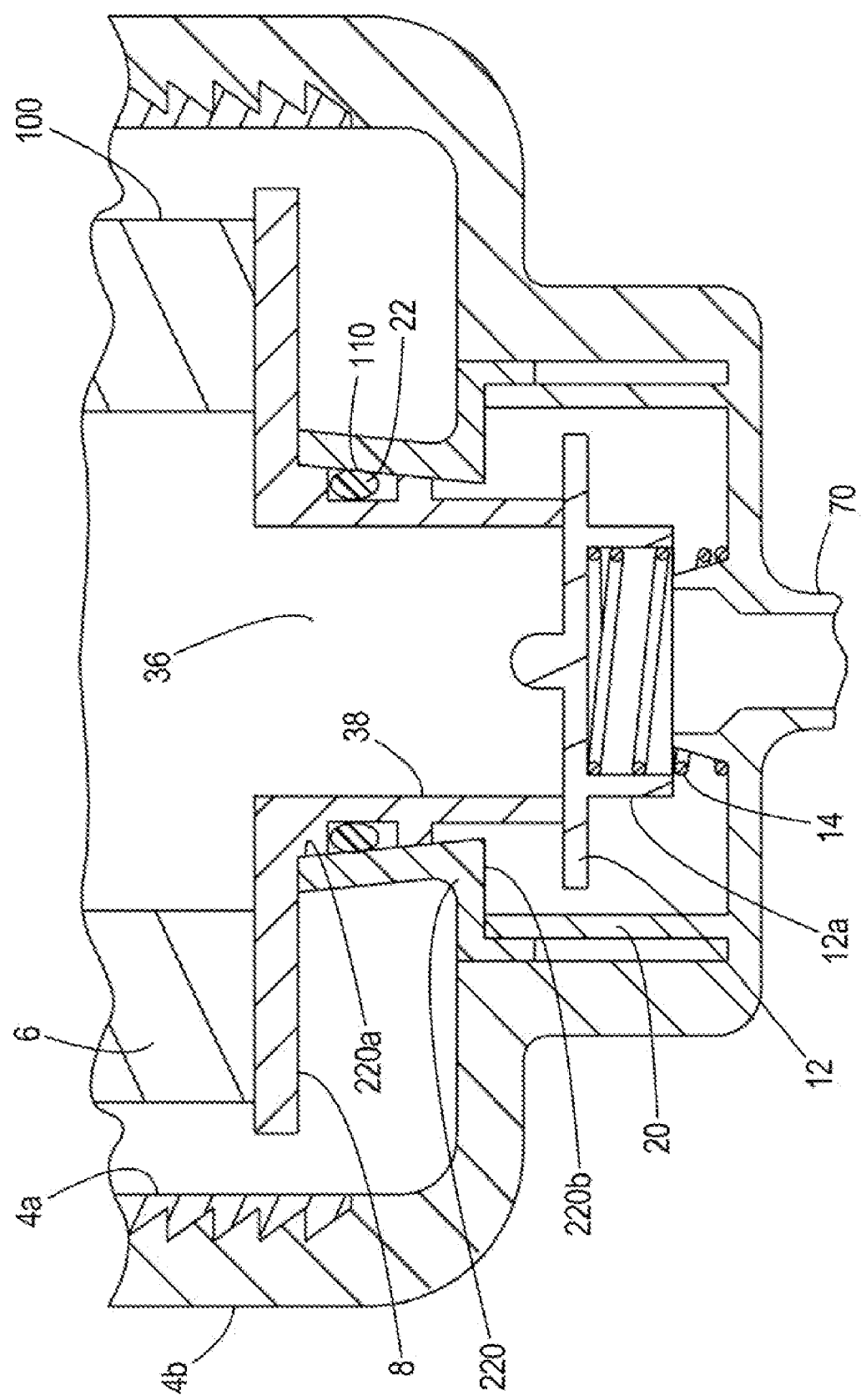
FIG. 12 illustrates an enlarged two-dimensional cross-section view of the drainage end of the coalescer system of FIG. 10.

FIG. 12 illustrates an enlarged two-dimensional cross-section view of the drainage end of the coalescer system of FIG. 10. The drainage end has a valve element positioned in the drainage chamber section 4*b*. The valve element includes a disc 12 biased into a closed position via a spring 14. The disc 12 includes a retaining ring 12*a* for the spring 14 where the spring 14 fits around the inside of the retaining ring 12*a*. The system 2 also includes a filter element 100 having media 6, a drainage end plate 8, and an intake end plate 10 (not shown). The drainage end plate 8 has a drainage spout 38 with an opening 36 through which through which gas A and dispersed liquid B may flow under excess pressure conditions (i.e., bypass conditions) such as when the filter media 6 is plugged and does not permit sufficient gas flow therethrough.

Further shown in FIG. 12, the system 2 also includes a retaining ring 20 positioned in the drainage chamber section 4*b* for the disc 12 and spring 14. A sealing ring 220 is positioned on the top surface of the retaining ring 20. The sealing ring 220 has a chamfered face 220*a* for contacting an O-ring 22 positioned on the exterior radial surface of the drainage spout 38 (i.e., around the neck of the drainage spout 38) of the drainage end plate 8 of the filter element 100. Contact point 110 of chamfered face 220*a* and O-ring 22 provides a seal. The chamfered face 220*a* of the sealing ring 220 fixes the filter element 100 axially to prevent vibratory damage during use. The chamfered face 220*a* also ensures that the O-ring 22 is always in compression. When the filter element 100 is inserted in the chamber 4 of the system 2, the drainage spout 38 contacts the disc 12 and moves the disc 12 to an open drainage position. When the filter element 100 is not inserted in the chamber 4 of the system 2, the disc 12 moves into a closed position and a top surface of the disc contacts an underside 220*b* of the sealing ring 220 and prevents liquid flow through the drainage spout 38.

Figure 13:
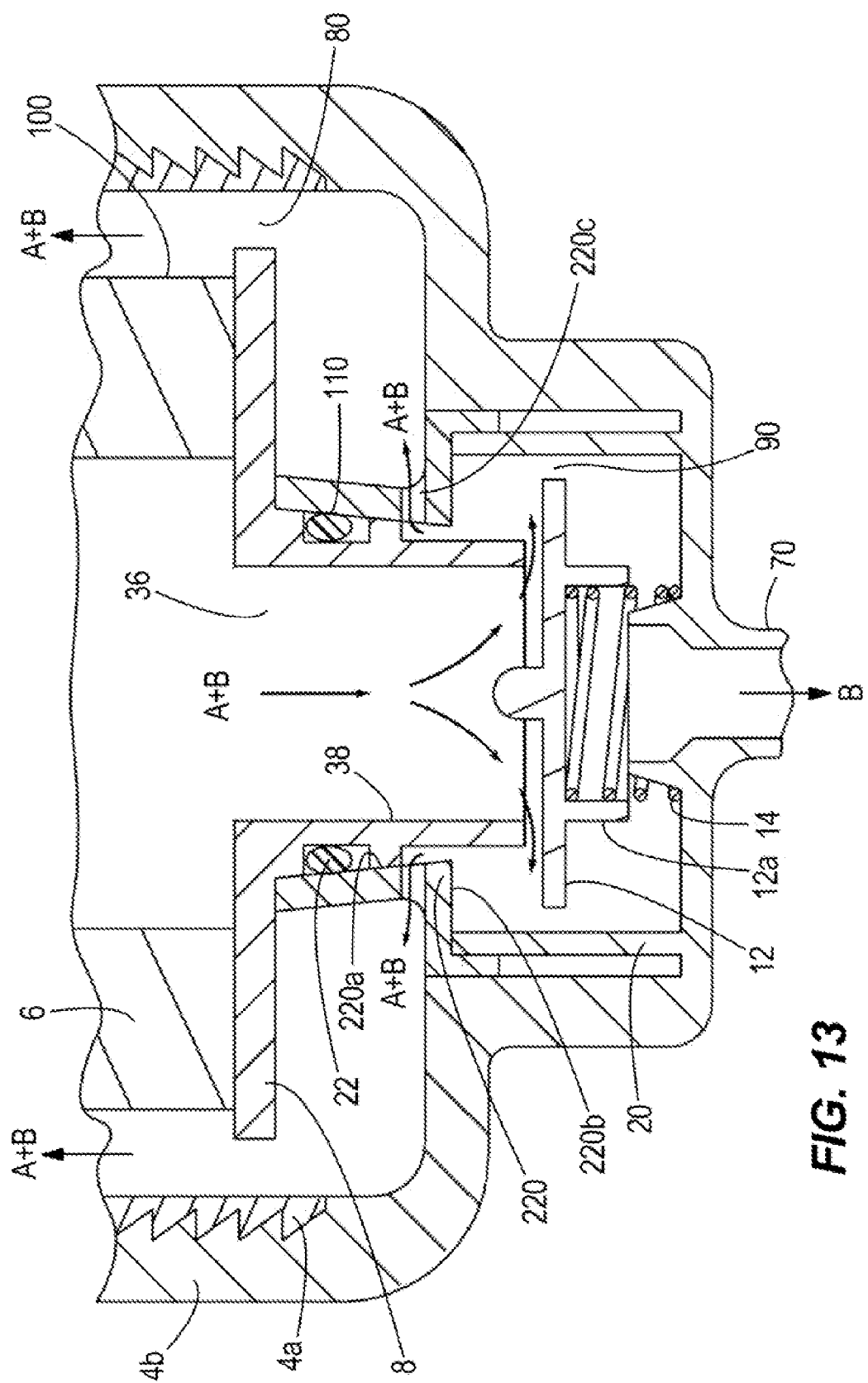
FIG. 13 illustrates airflow under bypass conditions through the drainage outlet of the filter element of the coalescer system of FIG. 10.

FIG. 13 illustrates airflow under bypass conditions through the drainage outlet of the filter element 100 of the coalescer system of FIG. 10. As shown in FIG. 13, under excess pressure conditions (i.e., bypass conditions) such as when the filter media 6 is plugged and does not permit sufficient gas flow therethrough, gas A and dispersed liquid B flow through the drainage spout 38, push the disc 12 to a further open position, and flow under the bottom of the drainage spout 38. The gas A and dispersed liquid B then flow through an opening 220*c* in the sealing ring 220, around a gap 80 between the drainage end plate 8 and the interior surface of the central chamber section 4*a*, and towards the gas outlet 60 (see FIG. 10), as shown by the arrows. As such, the valve element functions as a relief valve for flow of gas A and dispersed liquid B under excess pressure conditions. Additionally, coalesced liquid B also may flow around the disc 12 and through the drainage outlet 70. The system 2 is configured such that the filter element 100 contacts the valve element (e.g., via the spout 38 of the filter element 100 contacting the disc 12 of the valve element) and moves the valve element to a predetermined position to create the desired valve opening or cracking pressure for the system. For example, in FIG. 13, the system 2 is configured such that the filter element 100 moves the disc 12 of the valve element to a predetermined position to create the desired valve opening or cracking pressure for the system (e.g., based on compression of the spring 14 of the valve element).

Figure 14:
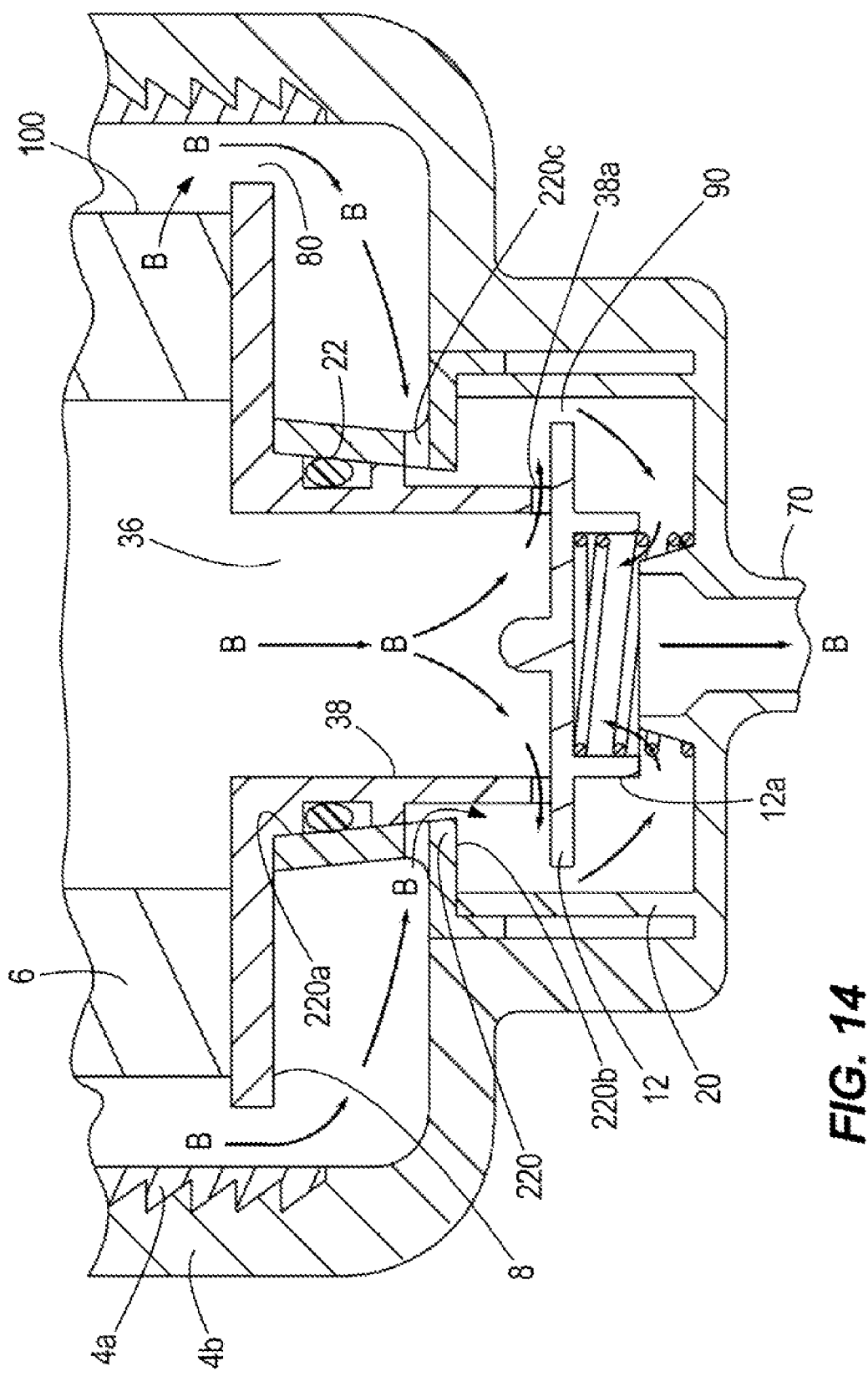
FIG. 14 illustrates drainage through the coalescer system of FIG. 10.

FIG. 14 illustrates drainage through the drainage end of the coalescer system of FIG. 10. When the filter element 100 is inserted in the system 2 and the disc or ball 12 is in an open position, coalesced liquid B drains from the drainage outlet 70. Arrows illustrate the flow of dispersed liquid B such as oil through the system. As shown in FIG. 14, a dispersed liquid phase B (e.g., hydrocarbon liquid (such as oil mist) and/or water) coalesces in the filter media 6 and drains vertically through the system (e.g., along the outside of the filter media 6 through a gap 80 between the filter media 6 and the interior surface of the central chamber section 4a). The coalesced liquid flows along the top surface of the sealing ring 220 and through a hole 220c in the sealing ring 220. The coalesced liquid then flows onto the surface of the disc or ball 12 and through a gap 90 between the disc or ball 12 and the retaining ring 20. A weeping hole 38a is provided along the bottom surface of the drainage spout 38 to prevent coalesced liquid B from collecting on the top surface of the disc or ball 12 (i.e. providing egress for coalesced liquid flowing along the inside surface of the filter media 6 and through outlet 36).

The coalescer systems disclosed herein may be adapted for use in coalescer systems and methods disclosed in the art. (See, e.g., U.S. Pat. Nos. 7,416,657; 7,326,266; 7,297,279; 7,235,177; 7,198,718; 6,907,997; 6,811,693; 6,740,358; 6,730,236; 6,605,224; 6,517,615; 6,422,396; 6,419,721; 6,332,987; 6,302,932; 6,149,408; 6,083,380; 6,056,128; 5,874,008; 5,861,087; 5,800,597; 5,762,810; 5,750,024; 5,656,173; 5,643,431; 5,616,244; 5,575,896; 5,565,078; 5,500,132; 5,480,547; 5,480,547; 5,468,385; 5,454,945; 5,454,937; 5,439,588; 5,417,848; 5,401,404; 5,242,604; 5,174,907; 5,156,745; 5,112,498; 5,080,802; 5,068,035; 5,037,454; 5,006,260; 4,888,117; 4,790,947; 4,759,782; 4,667,647; 4,643,834; 4,640,781; 4,304,671; 4,251,369; 4,213,863; 4,199,447; 4,083,778; 4,078,965; 4,052,316; 4,039,441; 3,960,719; 3,951,814; and U.S. published Application Nos. 2007-0289915; 2007-0107399; 2007-0062887; 2007-0062886; and 2007-0039865; the contents of which are incorporated herein by reference in their entireties.)

In the foregoing description, certain terms have been used for brevity, clarity, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

What is claimed is:

1. A coalescer system for coalescing a liquid phase dispersed in a gas phase, the system comprising:
   (a) a chamber having an inlet, a gas outlet, and a drainage outlet, wherein a gaseous phase comprising a dispersed liquid phase enters the chamber through the inlet and exits the chamber through the gas outlet;
   (b) a filter element for insertion in the chamber, the filter element comprising:
      (i) filter media for coalescing the dispersed liquid phase as the gaseous phase passes through the filter media, and
      (ii) endplates, namely an inlet end plate and a drainage end plate, wherein the end plates each have spouts with openings permitting flow of the gas phase and dispersed liquid phase therethrough, namely an inlet spout and a drainage spout: and
   (c) a valve element biased in a closed position;
   wherein:
   when the filter element is inserted in the chamber, the drainage spout opens the valve element and permits flow of the coalesced liquid phase through the drainage spout and through the drainage outlet of the chamber; and
   when the filter media becomes plugged, the filter element permits flow of the gaseous phase through the drainage spout and through the gas outlet, thereby bypassing the filter media.

2. The system of claim 1, wherein the inlet end plate and drainage end plate are identical.

3. The system of claim 1, wherein the valve element comprises a closing element biased against the spout of the end plate via a spring mechanism when the filter element is inserted in the system.

4. The system of claim 3, wherein the closing element is a disc or ball.

5. The system of claim 3, wherein the valve element comprises a retaining ring containing the closing element and the spring mechanism.

6. The system of claim 5, wherein the closing element is a disc.

7. The system of claim 6, wherein the disc has a patch of media on a top surface for contacting the drainage spout.

8. The system of claim 6, wherein the disc comprises a sealing element on a top surface that seals against a bottom surface of the retaining ring to prevent flow of the coalesced liquid phase through the drainage outlet of the chamber when a filter element is not inserted in the system.

9. The system of claim 1, wherein the chamber further comprises an auxiliary drainage outlet permitting flow of the coalesced liquid phase therethrough, and flow of the coalesced liquid phase through the auxiliary drainage is not dependent upon a filter element being inserted in the system.

10. The system of claim 1, wherein the drainage spout moves the valve element to an open drainage position via the drainage spout contacting a disc in the valve element that is biased in a closed position and moving the disc to an open position.

11. The system of claim 10, wherein the drainage spout comprises an O-ring around an exterior surface.

12. The system of claim 10, wherein the drainage spout comprises a sealing gasket about an end rim that axially contacts a top surface of the disc and that radially contacts an interior surface of an intake inlet of the chamber.

13. The system of claim 1, wherein the drainage spout comprises one or more notches in a surface that contact the valve element, thereby permitting flow of coalesced liquid phase therethrough.

14. A coalescer system for coalescing a liquid phase dispersed in a gas phase, the system comprising:
   (a) a chamber having an inlet, a gas outlet, and a drainage outlet, wherein a gaseous phase comprising a dispersed liquid phase enters the chamber through the inlet and exits the chamber through the gas outlet;
   (b) a filter element for insertion in the chamber, the filter element comprising:
      (i) filter media for coalescing the dispersed liquid phase as the gaseous phase passes through the filter media, and
      (ii) endplates, namely an inlet end plate and a drainage end plate, wherein the end plates each have spouts with openings permitting flow of the gas phase and dispersed liquid phase therethrough, namely an inlet spout and a drainage spout: and (c) a valve element biased in a closed position via a spring mechanism;

wherein:

when the filter element is inserted in the chamber, the drainage spout opens the valve element to an open position via compressing the spring mechanism, thereby permitting flow of the coalesced liquid phase through the drainage spout and through the drainage outlet of the chamber, the open position corresponding to cracking pressure for the system wherein when pressure in the system exceeds cracking pressure, the valve element is moved to a bypass position via further compression of the spring, thereby permitting bypass flow of the gaseous phase through the drainage spout and through the gas outlet.

15. The system of claim 14, wherein the inlet end plate and drainage end plate are identical.

16. The system of claim 14, wherein the valve element comprises a disc having a patch of media on a top surface.

17. The system of claim 14, wherein the valve element comprises a ring that contains the spring mechanism.

18. The system of claim 14, wherein the end plate moves the disc or ball to a height that creates compression in the spring that corresponds to cracking pressure for the system.

19. A coalescer system for coalescing a liquid phase dispersed in a gas phase, the system comprising:
(a) a chamber having an inlet, a gas outlet, and a drainage outlet, wherein a gaseous phase comprising a dispersed liquid phase enters the chamber through the inlet and exits the chamber through the gas outlet;
(b) a filter element for insertion in the chamber, the filter element comprising:
  (i) filter media for coalescing the dispersed liquid phase as the gaseous phase passes through the filter media, and
  (ii) endplates, namely an inlet end plate and a drainage end plate, wherein the end plates each have spouts with openings permitting flow of the gas phase and dispersed liquid phase therethrough, namely an inlet spout and a drainage spout: and
(c) a valve element comprising a closing element biased in a closed position via a spring mechanism;

wherein:

when the filter element is inserted in the chamber, the drainage spout moves the closing element to an open position via compressing the spring mechanism, thereby permitting flow of the coalesced liquid phase through the drainage spout and through the drainage outlet of the chamber, the open position corresponding to cracking pressure for the system wherein when pressure in the system exceeds cracking pressure, the closing element is moved to a bypass position via further compression of the spring, thereby permitting bypass flow of the gaseous phase through the drainage spout and through the gas outlet.

20. The system of claim 19, wherein the inlet end plate and drainage end plate are identical.

* * * * *